United States Patent
Kroman

(10) Patent No.: US 6,554,423 B2
(45) Date of Patent: Apr. 29, 2003

(54) PAIR OF SPECTACLES AND A METHOD OF THE MANUFACTURING OF A PAIR OF SPECTACLES

(75) Inventor: Flemming Kroman, Brabrand (DK)

(73) Assignee: Lindberg A/S, Aabyhoj (DK)

( * ) Notice: Subject to any disclaimer, the term of this patent is extended or adjusted under 35 U.S.C. 154(b) by 0 days.

(21) Appl. No.: 10/131,637

(22) Filed: Apr. 18, 2002

(65) Prior Publication Data

US 2002/0126254 A1 Sep. 12, 2002

Related U.S. Application Data

(63) Continuation of application No. PCT/DK99/00577, filed on Oct. 21, 1999.

(51) Int. Cl.[7] .............................................. G02C 5/12
(52) U.S. Cl. ......................... 351/138; 351/78; 351/80; 351/136
(58) Field of Search ......................... 351/136, 138, 351/139, 137, 41, 78, 80, 65

(56) References Cited

U.S. PATENT DOCUMENTS

| 4,235,530 | A | | 11/1980 | Stohrer ........................ 351/136 |
| 6,296,356 | B2 | * | 10/2001 | Kroman ........................ 351/138 |
| 6,315,406 | B1 | * | 11/2001 | Carraro et al. ................. 351/86 |

FOREIGN PATENT DOCUMENTS

WO    WO9826324    6/1998

* cited by examiner

Primary Examiner—Hung Xuan Dang
(74) Attorney, Agent, or Firm—Thomas R. Vigil; Welsh & Katz, Ltd.

(57) ABSTRACT

A pair of spectacles comprises two support elements (7) for engaging the nose of the wearer. Each support element comprises a pad (8) of an elastic material, a reinforcement member (22) and a peg (13) adapted for being received in the eyelet. The reinforcement member and the peg are adapted for mutual snap fitting engagement. The peg relieves the pad of any tensile forces and makes it feasible to select for the pad a very soft and comfortable material. Easy mounting and safe retention are provided. The invention further comprises a blank for the manufacturing of the peg, and a method of manufacturing a pair of spectacles.

12 Claims, 4 Drawing Sheets

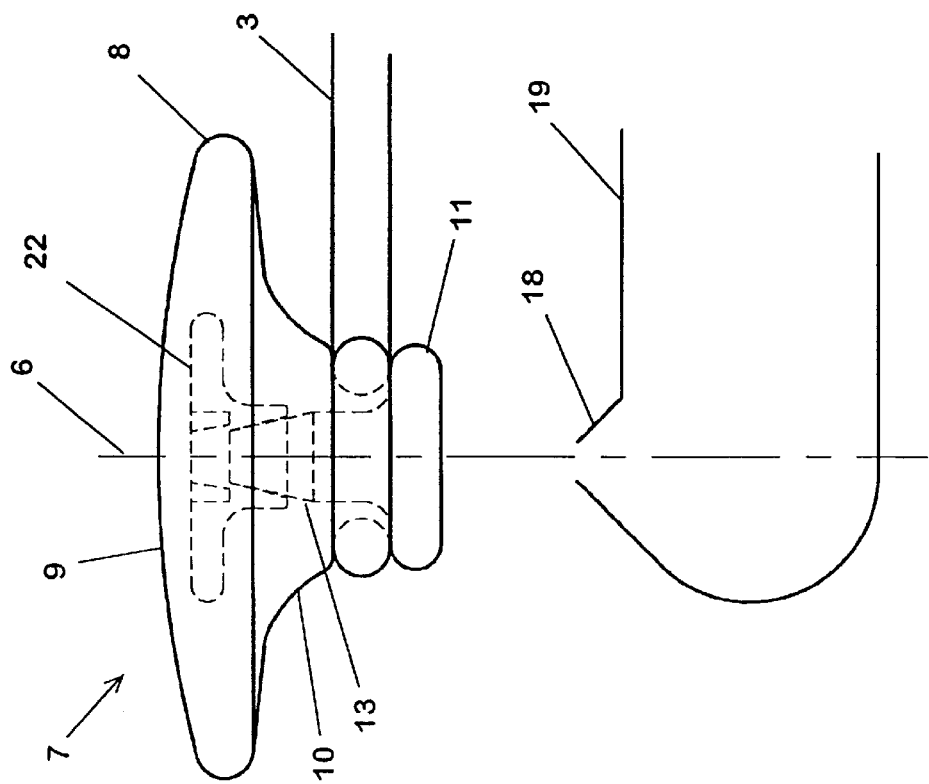
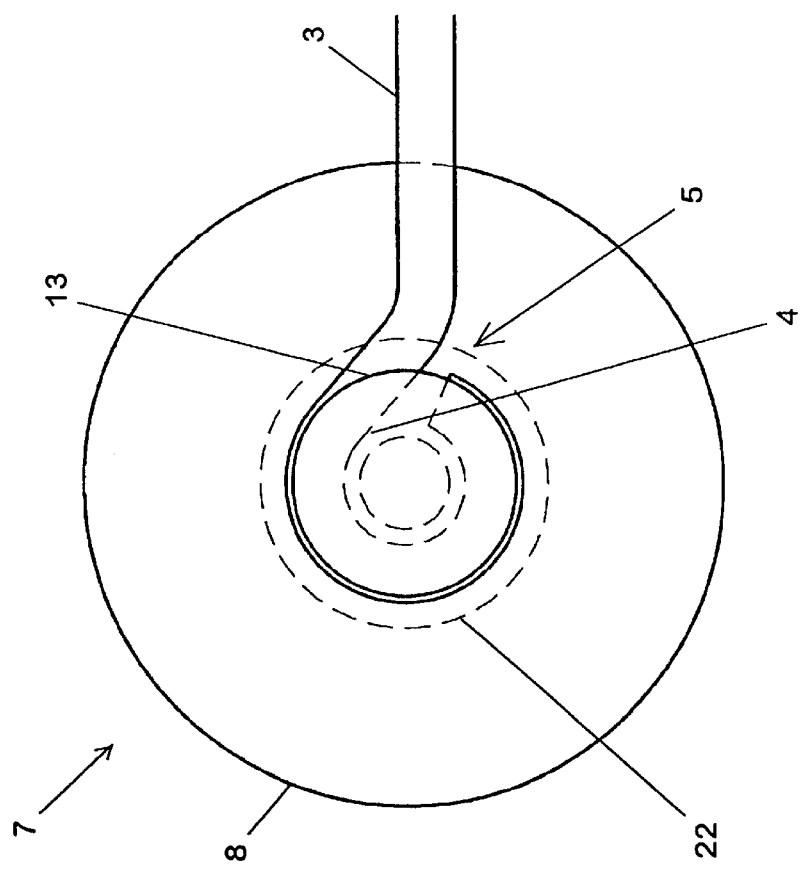

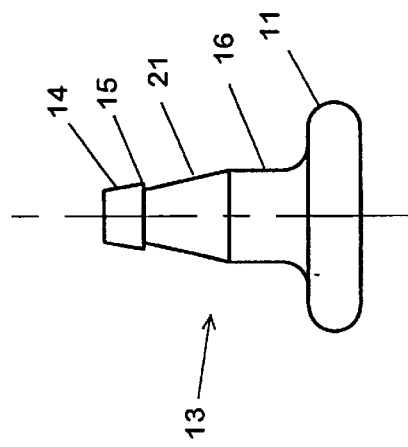
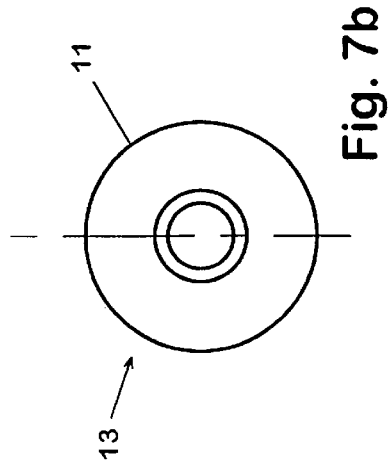
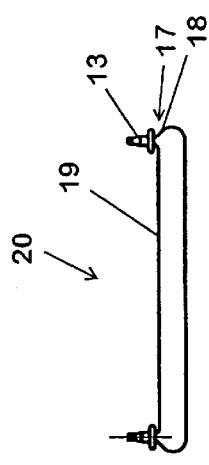
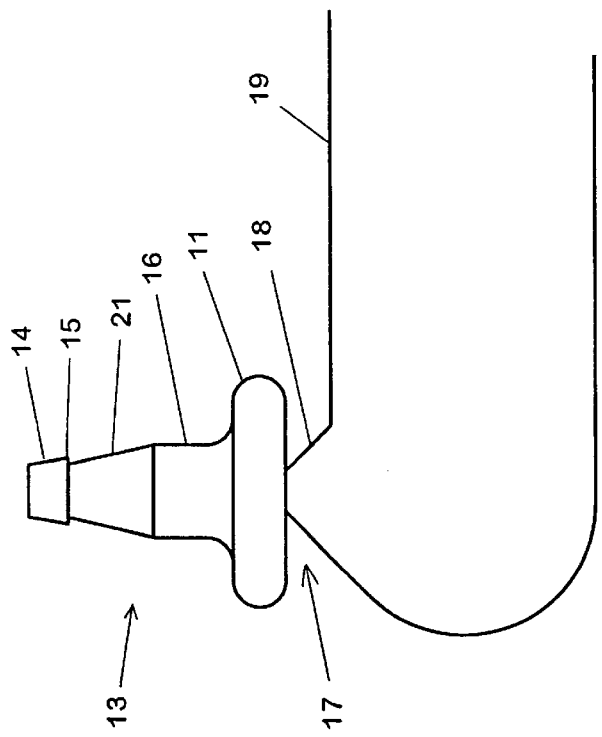

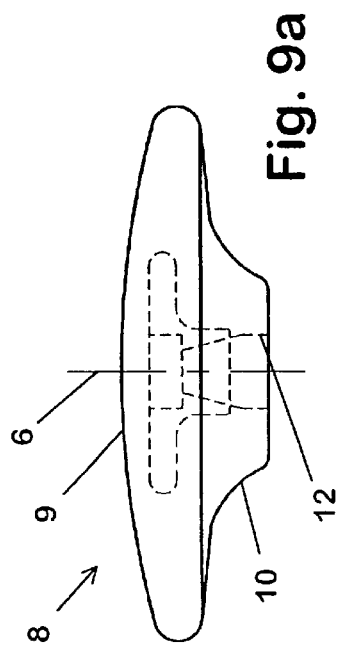
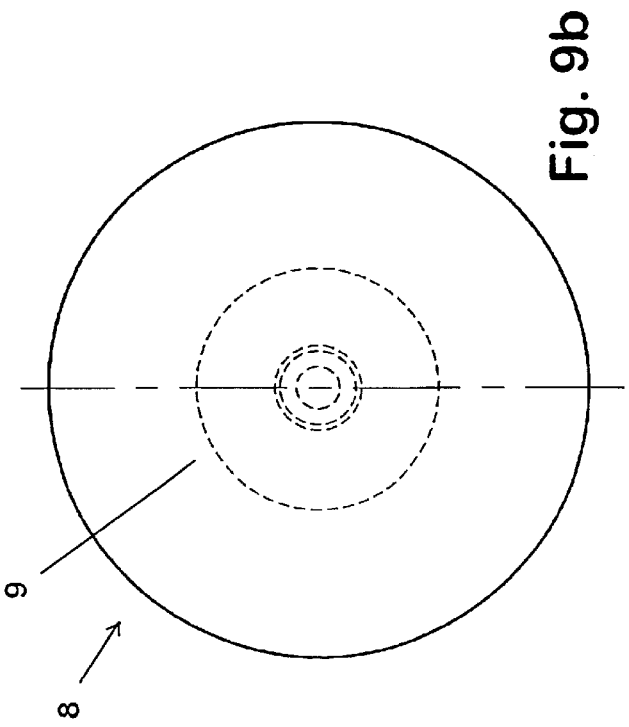
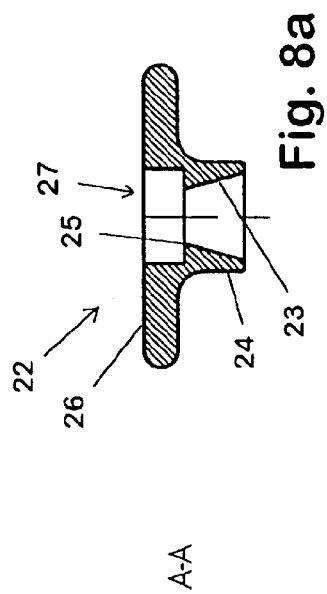
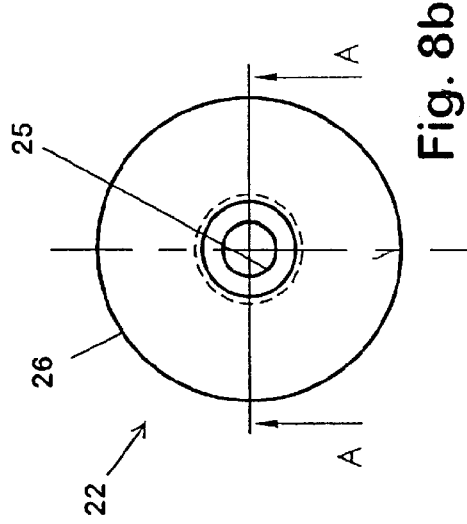

PAIR OF SPECTACLES AND A METHOD OF THE MANUFACTURING OF A PAIR OF SPECTACLES

1. Field of the Invention

The present invention relates to a pair of spectacles provided with a support element adapted for engaging a portion of the wearer's face. The invention further relates to a blank forming part of such support element and to a method for the manufacturing of a pair of spectacles.

As used herein spectacles mean the well known accessory which substantially comprises two lenses of glass or of other refractive or tinted material intended to be worn in front of the eyes of the user enabling him to see through the glasses, and a form of support or spectacle frame arranged to keep the lenses or glasses expediently fixed in the preferred position of use where the user can look straight forward with both eyes and with parallel lines of sight through the respective lenses.

In order to meet the function requirements of both supporting the weight of the spectacles and ensuring a relatively stable position in relation to the head of the user, the support is normally adapted for engaging one or more portions of the wearer's face, typically for engagement on the sides of the bridge of the nose. Support elements may comprise portions of the spectacle frame proper, portions of the rims of the glasses, or dedicated fittings secured to the spectacle frame or to the glasses.

The invention is relevant to spectacles in which the support elements comprise pads of particularly elastic, shock absorbing material selected for the best possible user comfort. With this design, the spectacle frame generally does not touch the bridge of the nose, and the dimensions of the spectacle frame proper can be kept to a minimum, and as a result thereof the weight of the spectacles as a whole is kept to a minimum.

2. Description of the Prior Art

It is known in the art to structure a spectacle frame of a wire of a light weight alloy comprising titanium and to provide a pair of support elements engaging the respective sides of the bridge of the nose, each support element comprising a pad integral with a shank with an enlarged head and being secured by way of inserting the shank with the enlarged head through a corresponding eyelet in the spectacle frame. In the prior art spectacles, the eyelet comprises a wire formed into a bight with a lateral opening.

WO-A-9826324 discloses a pair of spectacles with soft nose pads, wherein each nose pad comprises a shaft which is received in a respective eyelet of the spectacle frame. The shaft is provided with an enlarged head and it is inserted into the eyelet by being shifted into a lateral opening of the eyelet. Once the shaft is inserted, a peg is driven into an axial countersunk bore of the shaft so as to fill out part of the shaft with a comparatively hard core member.

In this solution, the shaft is engaged directly by the wire eyelet and subjected to loading in tension, a circumstance which must be taken into account in the selection of material for the pad. Incidentally, this consideration runs counter to other considerations such as user comfort, as those materials which are most favored for reason of softness and skin compatibility generally do not excel in tear strength and resistance to concentrated loading. Further, fitting the shaft is difficult in the case of a closed eyelet.

SUMMARY OF THE INVENTION

It is an object of the invention to provide a pair of spectacles which permit an optimum choice of materials in respect of user comfort.

It is a further object of the invention to provide a pair of spectacles, wherein the support elements are securely fastened and capable of enduring casual handling.

It is a still further object of the invention to provide a pair of spectacles, wherein the support elements are easily fitted and suitable for any kind of eyelet.

It is another object of the invention to provide a blank for use in the manufacturing of a pair of spectacles, which is simple in manufacturing and handling.

It is yet another object of the invention to provide a method for the manufacturing of a pair of spectacles which is simple and convenient.

In the spectacles, the pads are secured by the respective pegs engaging the frame eyelets. The pegs provide a stable fit of the pads. The pads are reinforced and they are generally not loaded in tension, therefore it is feasible to select for the pads a material which excels in term of softness and skin compatibility. On the other hand, in respect of the pegs it is feasible to select a structural material which interfaces well with the eyelets, also in case of eyelets which may impart concentrated loading. The pads may be fitted in all kinds of eyelets. The use of a sturdy material for the peg makes it possible to use also a thin peg adapted for fitting into a narrow eyelet. Assembly of the eyeglasses is facilitated by the tactile feel of the snap engagement which confirms when the proper engagement has been reached.

According to an expedient embodiment the pad of elastic material is resiliently compressed on the peg being inserted in the eyelet and pressed into the snap fitting engagement with the reinforcement member. This provides a stable and firm fit of the pad onto the frame.

According to an expedient embodiment the peg comprises a tapered front end portion and retention means such as barbs or an annular bead, adjacent the front end portion, in order to engage the reinforcement member. The tapered front end portion guides the peg during the insertion and the arrangement of the annular bead adjacent the front end portion ensures that any sharp edges will generally be well shielded inside the bulk of the pad for improved user comfort.

Preferably, the reinforcement member and the peg comprise respective guide faces adapted for a tight mutual fit. Thereby a firm non-rocking engagement is achieved.

According to an expedient embodiment, the reinforcement member comprises a flat disc-like structure adapted for distributing any forces applied between the peg and the pad. This kind of structure provides the optimum interface for the transfer of forces between the peg and the pad.

Preferably, the pad comprises a soft skin-compatible material, while the reinforcement member comprises a more sturdy material, selected for good structural properties and for good adhesion properties vis-a-vis the pad material.

A blank may expediently be used for providing the peg in the support element in a pair of spectacles as explained above. The blank comprises a handling piece used for the manipulation of the peg during mounting. Following the introduction of the dowel into the elastic pad and the achievement of the snap-fitting engagement, the handling piece is snapped off, severing it in the transition zone and leaving the dowel portion which constitutes the peg.

The handling piece provides a convenient tool for handling the minute item forming the peg and avoids the risk of accidentally losing it. The blank expediently comprises a transparent plastic material, e.g. polycarbonate suitable for injection molding and feasible for severing the handling piece by breaking it off. The sprue or the mold inlet portion appearing in the injection molding process expediently provides the handling piece.

According to an expedient embodiment one handling piece is integral with two dowels. This saves material and facilitates logistics in that the pegs are normally requested in pairs.

According to a further aspect of the invention there is provided a method as defined in claim 11. This method offers an easy assembly of a pair of spectacles which obtains a very expedient form.

According to an expedient embodiment, the step of injection molding said blank is adapted to form said handling piece in a mold inlet portion, connected to the shank through a reduced section transition zone. This utilizes a part of the molding, which would otherwise have been wasted.

BRIEF DESCRIPTION OF THE DRAWINGS

Further characteristic features and advantages of the invention will appear from the detailed description given below with reference to the drawings in which FIG. 3 illustrates the support element and an adjacent portion of the frame, on an enlarged scale and seen from the side of the frame, FIG. 4 is a side view of the support element introduced into the frame eyelet, and with the peg inserted, FIG. 5 is a side view of a blank according to the invention, FIG. 6 shows a detail from FIG. 5 depicted on an enlarged scale, FIG. 7 shows a peg, FIG. 7a showing a side view, FIG. 7b a plan view, FIG. 8 shows a reinforcement member, FIG. 8a showing an axial section, FIG. 8b a plan view, and FIG. 9 shows a nose pad, FIG. 9a showing a side view and FIG. 9b showing a plan view.

All figures are schematic and not necessarily drawn to scale and only show details deemed necessary for the understanding of the invention, whereas other details are omitted. All the figures use the same reference numerals for identical or similar parts.

DETAILED DESCRIPTION OF THE INVENTION

Figure 1:
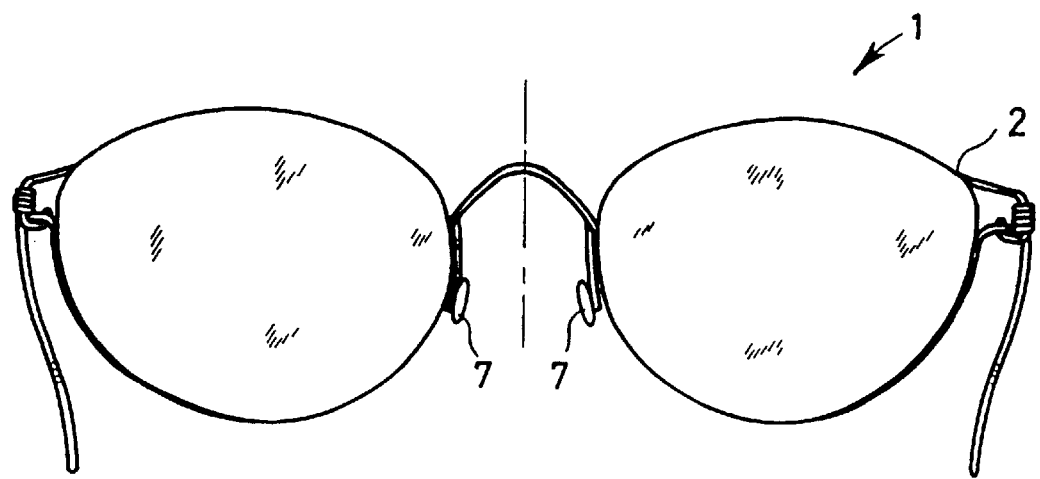
FIG. 1 is a front view of a pair of spectacles according to the invention.
Figure 2:
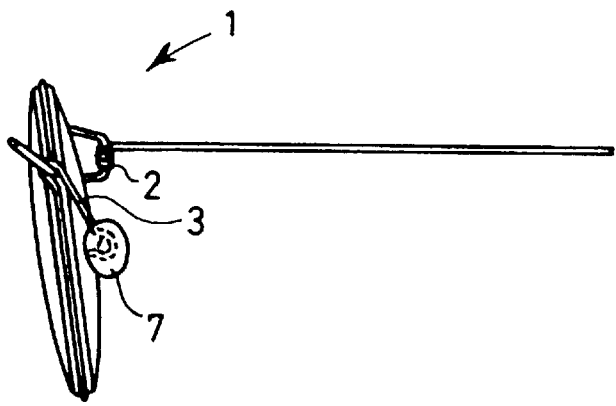
FIG. 2 is a sectional side view of the spectacles, the plane of section being the median plane of the spectacles.

Reference is first made to FIGS. 1 and 2 showing a pair of spectacles 1 according to the invention in front view and in sectional side view, respectively. These spectacles comprise various parts, generally held together by a spectacle frame 2 which provides a means for retaining glasses, hinges for the spectacle temple bars and two support elements 7. The spectacle frame 2 in the preferred embodiment is substantially formed by a resilient metal wire 3, such as a titanium alloy wire which has been found well suited for this purpose. In another preferred embodiment, the spectacle frame comprises a structure manufactured essentially by cutting and bending operations in a piece of plate, as explained in WO-A-9921047. Basically, the invention is applicable to any kind of eyeglass frame which features eyelets for the fitting of nose pads.

Reference is now made to FIGS. 9a and 9b which are an enlarged plan view and an enlarged side view, respectively, of a nose pad intended to engage a portion of the wearer's face. The nose pad 8 comprises a flat approximately rotational, symmetric body, which presents a surface of contact 9 adapted for engaging a portion of the user's face and to the opposite side a projecting stub 10 with an axial blind bore 12. The nose pad axis is denoted by the reference 6.

The nose pad includes a core member 22 which will be explained in further detail in the context of figure B. The nose pad is manufactured by injection molding around the core member. Suitable materials for the pad is a transparent silicone rubber such as Silopren LSR available from Bayer of Germany. Other similar soft bio-compatible rubbers, preferably with a Shore hardness in the range 40 to 80 will also do.

Reference is now made more particularly to FIGS. 5, 6 and 7 for a description of the blank 20 and of the peg 13. FIG. 5 shows the blank 20 molded in the form of an oblong component with widened end portions, the mold inlet portion 19 from the injection molding process constituting the largest portion and comprising a bar-like body leading through respective branch sprues 18 (pointing upward in FIGS. 5 and 6) and through respective reduced transition zones 17 into the pegs 13 proper.

The peg is a dowel-like element with a tapered head 14 which comprises a peripheral, backwards oriented bead or annular barb 15. Behind the bead the peg comprises a tapered shank 21 which continues in a generally cylindrical shaft 16, bordered to the other end by a circular collar 11. The cylindrical shaft is adapted to fit in the eyelet of the eyeglasses as will be evident for those skilled in the art. The peg and in particular the cylindrical shaft is adapted to fit the eyelet of the eyeglasses.

The branch sprue 18 tapers towards the transition zone 17 so as to form a wedge which will concentrate any bending forces and provide a zone prone to crack initiation on stressing the sprue relative to the cylindrical shaft in bending.

The blank is cast in a material such as a transparent polycarbonate marked Makrolon PC available from Bayer of Germany. Other similar materials, preferably capable of severing by cracking, can also be used.

Reference is now made to FIG. 8 for a description of the reinforcement member, also referred to as the core member 22. The core member comprises a generally flat rotational disc-like body with an axial opening surrounded by a sleeve 24 to one side of the disc 26. The other side of the disc is generally flat except for the opening. The sleeve defines a tapered socket demarcated at the narrow end by an edge 25, which marks a transition to a wider bore short of the flat face of the disc, also referred to as the chamber 27.

The core member is injection molded from a transparent polyamide such as PA 12 Grilamid available from Emser Werke of Germany. Other similar materials will also do provided they are capable of adhering to the material used for the pad.

The core member and the peg are mutually adapted in order that the peg taper shank 21 fits snugly inside the core taper socket 23 and in order that the head of the peg is accommodated in the chamber 27 without disturbing the flush appearance of the flat face of the core.

As noted above, the nose pad is molded around the core member. The nose pad is shaped to present an extended disc-like structure with a smooth rounded face (upwards in FIG. 4) adapted for presenting an agreeable contact surface. The central portion of the face is intimately backed by a face of the core member. To the other side (downwards in FIG. 9), the nose pad is molded with an opening 12 so as to permit access to the socket and the chamber inside the core member.

Reference is now made again to FIGS. 3 and 4 for a short description of the fitting of the support element in relation to the remaining portion of the spectacles. FIGS. 3 and 4 show a portion of the spectacle frame adapted for securing the support element and provided by appropriate forming of the wire 3 so as to provide an eyelet 4 with a lateral opening 5. For the purpose of fitting the support element, the peg is threaded into the eyelet 4 until the collar 11 engages one side of the eyelet, and the pad is approached towards the other side of the eyelet while registering the bore 12 with the head 14 of the peg.

The parts are forced axially together so as to drive the peg into the tapered socket 23 of the core member 22, and the peg is driven fully home to allow the barb 15 to snap into engagement with the edge 25. The snapping produces a tactile click feeling. During this operation the blank 20 is conveniently manipulated by the mold inlet portion 19. Once the snap engagement has been perceived, the mold inlet portion 19 is snapped off, severing the dowel in the transition zone 17 to leave the peg in the bore, and the mounting is completed.

In the mounted position the pad stub 10 is compressed axially against the side of the eyelet, the eyelet being restrained to the opposite side by the collar. This ensures a stable fit.

Should need arise, however, for removing the support element, e.g. for replacement, this can be done by engaging the collar 11 and wrenching the peg 13 away from the eyelet and from the pad with a force sufficient to make the barb 15 and/or the edge 25 yield resiliently, following which the peg 13 can be pulled out of the eyelet and the pad removed.

Even though concrete embodiments have been explained above for the elucidation of the invention, these embodiments are in no way considered to limit the invention which may be varied in many ways within the scope of the appended claims.

What is claimed is:

1. A pair of spectacles provided with a support element adapted for engaging a portion of the wearers face, and with an eyelet, said support element comprising a pad of elastic material, a reinforcement member and a peg adapted for being received in the eyelet, wherein the reinforcement member and the peg are adapted for mutual snap fitting engagement.

2. The spectacles according to claim 1, wherein the peg comprises a collar adapted to engage the eyelet.

3. The spectacles according to claim 1, wherein the pad of elastic material is adapted to be resiliently compressed on the peg being inserted in the eyelet and pressed into the snap fitting engagement with the reinforcement member.

4. The spectacles according to claim 1, wherein the peg comprises a tapered front end portion and retention means, adjacent the front end portion, in order to engage the reinforcement member.

5. The spectacles according to claim 1, wherein the reinforcement member and the peg comprise respective guide faces adapted for a tight mutual fit.

6. The spectacles according to claim 1, wherein the reinforcement member comprises a flat disc-like structure adapted for distributing any forces applied between the peg and the pad.

7. The spectacles according to claim 1, wherein the pad comprises a soft skin-compatible material, while the reinforcement member comprises a more sturdy material.

8. A blank for use in the manufacturing of a peg adapted for being inserted into an eyelet in a pair of spectacles and for snap-fitting engagement with a reinforcement member inside an elastic pad, said blank comprising a dowel with a tapered front end, a shaft, and a collar, and a handling piece, integral with the dowel by the collar and provided with a notch defining the transition zone from the handling piece to the dowel.

9. The blank according to claim 8, wherein one handling piece is integral with two dowels.

10. The blank according to claim 8, comprising a plastics material with a capacity of breaking at the transition zone when stressed.

11. A method for the manufacturing of a blank according to claim 8, comprising the step of injection molding said blank in a mold adapted to form said handling piece in a mold inlet portion, connected to the shank through a reduced section transition zone.

12. A method for the manufacturing of a pair of spectacles, comprising the steps of:
   providing in a frame of the spectacles an eyelet,
   inserting a peg through the eyelet, said peg comprising retention means,
   threading onto the protruding portion of the peg a support element, said support element comprising a pad of elastic material, and a reinforcement member, and driving the peg into snap fitting engagement with the reinforcement member, while resiliently compressing at least part of the pad against a second side of the eyelet.

* * * * *